United States Patent [19]

Novis et al.

[11] Patent Number: 4,816,726
[45] Date of Patent: Mar. 28, 1989

[54] METHOD OF AND ARRANGEMENT FOR CONTROLLING AND H-BRIDGE ELECTRIC MOTOR

[75] Inventors: Ari M. Novis, Rocky Hill; Stuart C. Wright, Woodbridge; Don L. Adams, Fairfield, all of Conn.

[73] Assignee: United Technologies Corporation, Hartford, Conn.

[21] Appl. No.: 96,196

[22] Filed: Sep. 14, 1987

[51] Int. Cl.[4] .............................................. H02P 1/22
[52] U.S. Cl. ................................... 318/293; 318/258; 318/375
[58] Field of Search ............................... 318/254–258, 318/293, 291–292, 739–741, 757–759, 370–371, 375–382; 307/254, 255, 262, 270

[56] References Cited

U.S. PATENT DOCUMENTS

| | | | |
|---|---|---|---|
| 4,217,528 | 8/1980 | Scheying et al. | 318/293 |
| 4,329,630 | 5/1982 | Park | 318/293 |
| 4,416,352 | 11/1983 | Husson et al. | 318/293 |
| 4,494,181 | 1/1985 | Ramlohr et al. | 318/293 |
| 4,527,103 | 7/1985 | Kade | 318/293 |
| 4,544,869 | 10/1985 | Pittaway | 318/293 |
| 4,663,575 | 5/1987 | Juzswik et al. | 318/293 |
| 4,710,686 | 12/1987 | Guzik | 318/293 |

Primary Examiner—William M. Shoop, Jr.
Assistant Examiner—David Martin
Attorney, Agent, or Firm—Peter R. Ruzek

[57] ABSTRACT

A method of and an arrangement for controlling the operation of a reversible D.C. electric motor including a winding having two ends each of which is connected to both the positive and negative terminals of an electric current source through respective control switches that can be selectively closed and opened in response to command signals to apply voltage differentials across the winding with attendant electric current flow through the winding in one or the opposite direction for operating the electric motor in one or the other of its senses of rotation with intervening rotation sense reversals utilize the original command signals for determining when the sense of rotation reversal would result in an excessive electric current flow through the winding. In such a case, the original command signals are temporarily replaced by substitute command signals of such a character that both of the winding ends are connected through the respective control switches to only one of the electric current source terminals with attendant dynamic braking of the electric motor.

10 Claims, 6 Drawing Sheets

FIG. 2

PWM H-BRIDGE MOTOR
DRIVER LOGIC

|  |  | A | B | C | D |
|---|---|---|---|---|---|
| DYNAMIC BRAKE OFF | COMMAND > 0 | PULSE | OFF | OFF | PULSE |
|  | COMMAND < 0 | OFF | PULSE | PULSE | OFF |
|  | COMMAND = 0 | OFF | OFF | OFF | OFF |
| DYNAMIC BRAKE ON | COMMAND = 0 | OFF | OFF | ON | ON |

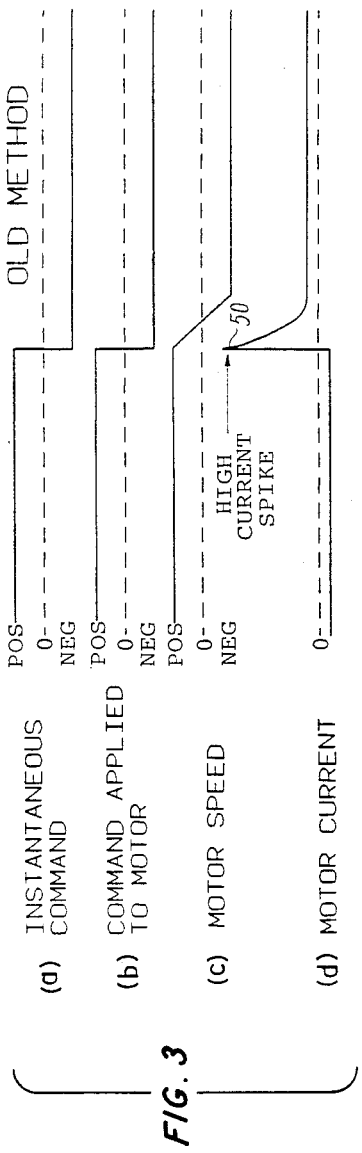
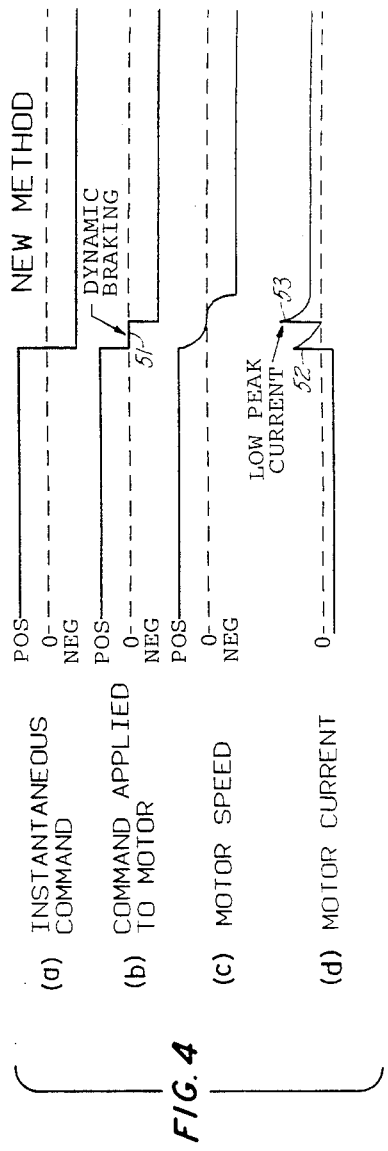

METHOD OF AND ARRANGEMENT FOR CONTROLLING AND H-BRIDGE ELECTRIC MOTOR

TECHNICAL FIELD

The present invention relates to controlling the operation of electric motors in general, and more particularly to a method of and an arrangement for controlling the operation of a D.C. electric motor.

BACKGROUND ART

It is known to supply electric energy to a winding of a reversible permanent magnet D.C. electric motor by means of a circuit arrangement that is often referred to as an H-bridge motor control circuit and includes electric conductors which respectively connect each of the ends of the winding with each of the negative and positive terminals of an electric current source. In this type of a motor control circuit, a control switch is interposed in each of the aforementioned electric conductors between each of the terminals and each of the winding ends. Then, it is possible to control the operation of the electric motor, that is, its energization for rotation in one or the other of its senses of rotation, a reversal in its sense of rotation, its dynamic braking, and its de-energization, by causing selected ones of the control switches to assume their closed positions in which they permit the passage of electric current therethrough while causing the remaining control switches to assume their open positions in which they prevent passage of electric current therethrough.

In operating an electric motor utilizing the aforementioned H-bridge motor control circuit, it is sometimes or even frequently necessary to accomplish a reversal in the sense of rotation of the electric motor from a relatively high or even full speed in one sense to a relatively high or even full speed in the opposite sense. Under these circumstances, magnetic flux fields existing in the electric motor at the beginning of the reversal induce an electric current spike in the motor winding, inasmuch as the electric motor acts as a generator during its slowdown. Simultaneously with the occurrence of this induced electric current surge, the gradient of the voltage differential supplied from the electric power source to the winding is reversed by switching the previously closed control switches into their open positions and the previously open control switches into their closed positions. This combination of electromagnetic phenomena results in a total magnitude of the electric current spike, when the called-for speed of rotation reversal is considerable, which is larger and often much larger than the electric current spike encountered during the start-up of the electric motor from standstill. As a matter of fact, when the reversal is to be from full speed of rotation in one sense to full speed of rotation in the opposite sense, the magnitude of the electric current spike is about twice that of the normal start-up current spike.

Obviously, this is very disadvantageous since this relatively high electric current spike may damage the electric motor circuitry which is usually designed or rated on the basis of the normal start-up current spike. Moreover, the amplitude of the current spike may be so large as to exceed the current rating of the motor, which leads to at least partial demagnetization of the permanent magnets used in such a motor. When this happens, a larger electric current than that required otherwise is needed for operating the motor. As a consequence, the winding, transistors and motor efficiency all suffer. To avoid these problems, resort has been made to overdesign of the electric motor and the associated circuitry so as to be able to handle such excessive current spikes including those occurring during the full rotational speed reversal. So, for instance, there have been employed in the electric motor design permanent magnets that are less affected by current surges, larger motor casings that are able to dissipate heat resulting from associated power losses because of their larger surface area, and control transistors/module assemblies capable of dissipating and resisting power surges. However, such overdesign of the electric motor and the associated circuitry and components thereof results in an increased size, weight and cost of the electric motor assembly.

In the alternative, it has been proposed to rate-limit the motor command to prevent large electric current spikes. However, if the rate limiting is sufficiently high to prevent large current spikes for large motor command changes, the electric motor response to small motor command changes suffers as well.

There are also already known, for instance from the U.S. Pat. Nos. 4,217,528, 4,494,181, 4,527,103 and 4,544,869, various control arrangements that operate the control switches of the H-bridge motor control circuit in response to external command signals. However, these known control arrangements suffer of one or more of the above-discussed disadvantages, that is, either they do not provide for an automatic control of the electric current flowing through the winding at all, or the electric current control is applied across the board, that is, not only for large motor command reversals but also for small ones.

Accordingly, it is a general object of the present invention to avoid the disadvantages of the prior art.

More particularly, it is an object of the present invention to develop an arrangement for controlling the operation of an H-bridge reversible D.C. motor, which arrangement does not possess the disadvantages of the known arrangements of this type.

Still another object of the present invention is so to construct the arrangement of the type here under consideration as to be able to automatically recognize reversal commands which would result in excessive current spikes and to modify the control of the motor in response to such recognition in such a manner as to avoid such excessive current spikes.

It is yet another object of the present invention to design the above arrangement in such a manner as to be relatively simple in construction, inexpensive to manufacture, easy to use, and reliable in operation nevertheless.

A concomitant object of the present invention is to provide a method of controlling the operation of the H-bridge reversible D.C. motor that renders it possible to achieve an automatic limitation of the current flowing through the electric motor winding during sense or rotation reversals in the event that such current flow would be excessive.

DISCLOSURE OF THE INVENTION

The above objects and others which will become apparent hereafter are achieved by an arrangement of the present invention for controlling the operation of a reversible D.C. electric motor including a winding having two ends each of which is connected to both the positive and negative terminals of an electric current source through respective control switches that can be selectively closed and opened in response to command signals to apply voltage differentials across the winding with attendant electric current flow through the winding in one or the opposite direction for operating the electric motor in one or the other of its senses of rotation with intervening rotation sense reversals. In accordance with the invention, the controlling arrangement includes means for determining from the command signals when a reversal in the sense of rotation of the electric motor is to ensue, and means for temporarily replacing the original command signals upon such determination by substitute command signals of such a character that both of the winding ends are connected through the respective control switches to only one of the electric current source terminals with attendant dynamic braking of the electric motor.

Advantageously, the determining means includes means for providing lagged versions of the original command signals, means for comparing the original command signals with the lagged versions thereof and issuing a control signal for use in activating the replacing means when such comparison indicates that the rotation sense of the electric motor is to be reversed, means for detecting from the values of the original command signals when the rotation sense reversal would cause the electric current through the winding to exceed a predetermined magnitude, and means for activating the replacing means only upon such detection.

The present invention also relates to a method of controlling the operation of a reversible D.C. electric motor including a winding having two ends each of which is connected to both the positive and negative terminals of an electric current source through respective control switches that can be selectively closed and opened in response to command signals to apply voltage differentials across the winding with attendant electric current flow through the winding in one or the opposite direction for operating the electric motor in one or the other of its senses of rotation with intervening rotation sense reversals. The method of the present invention comprises the steps of determining from the command signals when a reversal in the sense of rotation of the electric motor is to ensue, and temporarily replacing the original command signals upon such determination by substitute command signals of such a character that both of the winding ends are connected through the respective control switches to only one of the electric current source terminals with attendant dynamic braking of the electric motor.

More particularly, the method of the present invention advantageously comprises the steps of providing lagged versions of the original command signals, comparing the original command signals with the lagged versions thereof and issuing a control signal when such comparison indicates that the rotation sense of the electric motor is to be reversed, subtracting the original command signals and the lagged versions thereof from one another, forming an absolute value of the subtraction result, comparing the absolute value with a predetermined threshold value and issuing an additional control signal only when the absolute value exceeds the threshold value, establishing simultaneous occurrence of both the control signal and the additional control signal and issuing an activating signal only in response to such occurrence, presenting an output signal which is switched in response to the activating signal from the lagged versions of the command signals to a predetermined command signal value, and converting the output signal and the activating signal into ultimate command signals for switching the control switches, the ultimate command signals being of such a character that both of the winding ends are connected through the respective control switches to only one of the electric current source terminals with attendant dynamic braking of the electric motor when the activating signal and the predetermined command signal value are being converted.

BRIEF DESCRIPTION OF THE DRAWING

The present invention will be described in more detail below with reference to the accompanying drawing in which:

FIG. 2 is a logic table depicting the dependence of the ultimate command signals applied to the control switches of the driving circuitry of the electric motor on the original command signals;

FIGS. 3a to 3d are graphic representations dependences of various operating parameters of the electric motor on time in the absence of the control circuitry of FIG. 1;

FIGS. 4a to 4d are graphic representations respectively corresponding to those of FIGS. 3a to 3d but with the use of the control circuitry of FIG. 1;

BEST MODE FOR CARRYING OUT THE INVENTION

Figure 1:
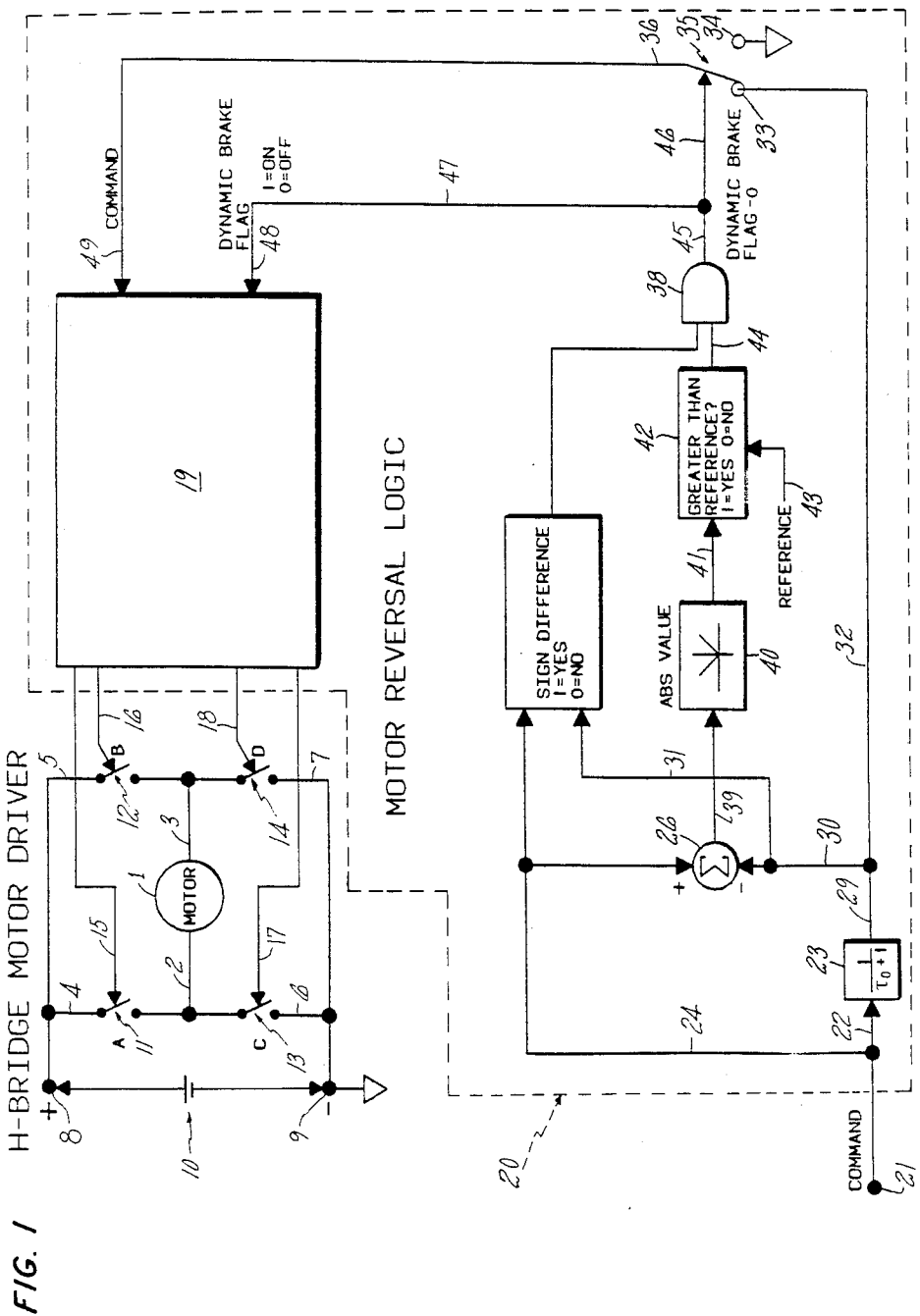
FIG. 1 is a somewhat simplified circuit diagram of a control circuitry according to the present invention and of a H-bridge electric motor controlled thereby.

Referring now to the drawing in detail, and first to FIG. 1 thereof, it may be seen that the reference numeral 1 has been used therein to identify an electric motor. The electric motor 1 is constructed as a reversible permanent magnet D.C. motor and includes, as is well known and hence has not been illustrated, at least one winding having two ends each of which is connected to a different one of leads 2 and 3 of the electric motor 1. The lead 2 is connected by electric conductors 4 and 6 to a positive terminal 8 and to a negative terminal 9, respectively, of a D.C. source which is diagrammatically indicated at 10. Similarly, the lead 3 is connected by electric conductors 5 and 8 to the positive terminal 7 and to the negative terminal 9 of the D.C. source 10, respectively.

Respective control switches 11, 12, 13 and 14, which are also identified, in that order, by the reference characters A, B, C and D, are interposed in the electric conductors 4, 5, 6 and 7. The control switches 11, 12, 13 and 14 may be of any well known construction; for instance, they may be constituted by transistors, electromagnetic relays or the like. The control switches 11, 12, 13 and 14 can be switched between their illustrated open positions in which they separate the leads 2 and 3 from the terminals 8 and 9 and their non-illustrated closed positions in which they electrically connect the respective lead 2 or 3 via the respective electric conductor 4, 5, 6 or 7 in which they are incorporated with the respective terminal 8 or 9.

The closing and/or opening of the switches 11, 12, 13 and 14 occurs in response to respective ultimate command signals which are indicated in FIG. 1 by arrowheaded lines 15, 16, 17 and 18, respectively. The lines 15, 16, 17 and 18 may be electric conductors which are directly connected to control inputs of the respective control switches 11, 12, 13 and 14 when the latter are constituted, for instance, by transistors, or they may be representative of more complex arrangements, such as a series of amplifiers, transistors, or the like when the control switches 11, 12, 13 and 14 are constituted, for instance, by electromagnetic relays or the like. In any event, the lines 15, 16, 17 and 18 constitute respective outputs of a driving or translating circuit 19 which operates in a manner that will be described later and which constitutes a part of a control circuit 20 constructed in accordance with the present invention.

The operation of the control circuit 20 is determined by original or initial command signals which are supplied to a command input 21 of the control circuit 20. These original command signals are of the same type as those supplied to the heretofore known electric motor drive circuits. However, unlike in such known arrangements, these command signals are first processed by the control circuit 20 before reaching the driving or translating circuit 19 to extract therefrom information as to the magnitude of the motor rotation sense reversal to take place and to modify the actuation of the switches 11, 12, 13 and 14 accordingly.

To this end, the original command signals are supplied from the command input 21 through a line 22 to an input of a delay device 23 of a conventional construction which generates lagged versions of the original command signals. The original command signals are also supplied through branch lines 24 and 25 to a non-inverting input of a summing arrangement 26. Simultaneously, another branch line 27 supplies the original command signals to one input of a sign comparison device 28. The output signals of the delay device 23, which are the lagged versions of the original command signals, are presented at an output line 29 and are supplied therefrom through a branch line 30 to an inverting input of the summing device 26 that then generates an output signal representative of the difference between the original command signals and their lagged versions.

Simultaneously, the lagged versions are fed through another branch line 31 to another input of the sign comparison device 28. The device 28 is of any well known construction and is operative for generating a binary signal of a first value (such as binary "0") when the signs of the input signals supplied to the inputs of the sign comparison device 28 through the lines 27 and 31 are in agreement, and of a second value (such as binary "1") when the signs of such input signals supplied through the lines 27 and 31 are different. Furthermore, the lagged versions of the original command signals are supplied through an additional branch line 32 to one terminal 33 of a switch 35 whose other terminal 34 is grounded. The switch 35, which may be of any known construction, can be switched in response to switching signals between its illustrated position in which it connects a command line 36 with the switch terminal 33, so that the lagged versions of the original command signals propagate through the switch 35 to the command line 36, and its non-illustrated other position in which it connects the command line 36 with the switch terminal 34, so that the command line 36 is grounded. The ground may have a binary "0" value attributed to it.

The operation of the switch 35 is controlled by the output signals of the summing device 26 and of the sign comparison device 28. The output signal of the sign comparison device 28 is supplied through a connecting line 37 to one input of a logic element 38 which, in the illustrated design, is constituted by an AND-gate. On the other hand, the output signal of the summing device 26 is supplied through another connecting line 39 to an input of a device 40 which is of a well known construction and is operative for producing an absolute value of the output signal of the summing device 26. This absolute value is then forwarded through an additional connecting line 41 to a comparator 42 of any well known construction which compares this absolute value with a reference or threshold value that is shown to be supplied to the comparator 42 by a supply line 43. The comparator 42 generates a first binary signal (such as a binary "1") when the aforementioned absolute value exceeds the threshold value, and a second binary signal (such as a binary "0") when the absolute value is below the threshold value. The respective binary signal of the comparator 42 is then supplied through a connecting line 44 to another input of the logic element 38.

The logic element 38 issues at its output 45 a signal of one binary value (such as binary "1" in the above-described situation) if and only if both of the input signals supplied to its inputs through the connecting lines 37 and 44 have the first binary value (i.e. binary "1"), and of the other binary value (such as binary "0") for all remaining combinations of the first and second binary values of the input signals. The output signal of the logic element 38 is then used as a control or activating signal for the switching of the switch 35 between its two positions, as indicated by an arrowheaded line 46. Here again, the line 46 is representative of any known actuating arrangement, in the same manner as discussed before in connection with the switching of the switches 11 to 14. In the example described above, the switch 35 is caused to assume its non-illustrated position in which it connects the command line 36 with the grounded terminal 34 when the output signal of the logic element 38 has the one binary value and its illustrated position in which it connects the command line 36 with the terminal 33 receiving the lagged versions of the original command signals when the output signal of the logic element 38 has the other binary value.

The output signal of the logic element 38 is also supplied as a dynamic brake flag signal via a branch-off line 47 to one input 48 of the driving or translating circuit 19. The command line 36 leads to another input 49 of the driving or translating circuit 19 to supply thereto an intermediate command signal which is then being furnished by the switch 35. The driving or translating circuit 19 then generates, on the basis of the dynamic brake flag signal and the intermediate command signal supplied to the inputs 48 and 49 thereof, respectively, the ultimate command signals which appear at the outputs 15, 16, 17 and 18 and which control the positions of the switches 11, 12, 13 and 14, respectively.

An example of the construction of the switch driving or translating circuit 19 will be discussed in some detail later, as will the details of the operation of this particular construction of the circuit 19. At this juncture, it is sufficient to mention that the circuit 19 generates the ultimate command signals in the manner which is depicted in the logic table of FIG. 2. It may be seen there that, so long as the dynamic brake flag is off (i.e. the flag signal at the input 48 is a binary "0"), that is, so long as the electric motor 1 either is to continue its rotation in one sense or the sense of the rotation of the electric motor 1 is to be reversed but the magnitude of the electric current in its winding would not be excessive, the switches A, B, C and D (or 11, 12, 13 and 14) are operated in a well-known manner in response to the intermediate command signals which are then constituted by the lagged versions of the original command signals. This mode of operation of the driving or translating circuit 19 is well known, as is the circuitry accomplishing this operating mode, so that they need not be addressed in any more detail at this point.

On the other hand, and in deviation from the prior art, when the dynamic brake flag is on (i.e. the flag signal at the input 48 is a binary "1"), that is, when the sense of the rotation of the electric motor 1 is to be reversed and the magnitude of the electric current in its winding would be excessive, the switches A, B, C and D (or 11, 12, 13 and 14) are operated in such a manner that both ends of the winding of the electric motor 1 are simultaneously connected to one of the terminals 8 and 9 of the electric power source 10 (in the depicted exemplary implementation, to the terminal 9). Thus, the winding of the electric motor 1 is short-circuited in this situation, and the electric current induced in the winding is dissipated before electric current of a polarity corresponding to the new sense of rotation is supplied from the source 10 to the winding of the electric motor 1.

This situation is graphically depicted in FIGS. 4a to 4d of the drawing for comparison with the situation where the electric motor 1 is operated without the use of the present invention and which is shown in corresponding FIGS. 3a to 3d. It may be seen in FIGS. 3a to 3d that, when the electric motor 1 is operated in the conventional manner, the instantaneous original command signal is being directly used to control the operation of the switches 11, 12, 13 and 14, so that the motor speed rapidly changes from high speed of rotation in one sense to high speed of rotation in the opposite sense. This reversal results in a high electric current spike 50 whose magnitude may be as high as twice the start-up current spike of the motor 1.

On the other hand, as shown in FIGS. 4a to 4d, when proceeding in accordance with the present invention, the operation of the electric motor 1 during any excessive sense of rotation reversal is accomplished in two steps, with dynamic braking indicated at 51 intervening between energizations of the winding with opposite polarities. As a result, the speed of rotation of the electric motor 1 is first reduced to zero during the dynamic braking and only then is the electric motor accelerated again to the desired speed of rotation in the opposite sense after the dynamic brake flag has been discontinued. The electric motor current exhibits a first spike 52 at the beginning of the dynamic braking and a second spike 53 at the beginning of the rotation in the opposite sense. It may also be seen that the magnitudes of the electric current spikes 52 and 53 are much smaller than that of the spike 50, each generally corresponding to the start-up spike occurring at the commencement of the operation of the electric motor 1 from standstill to the desired speed in the respective sense of rotation. The amount of time during which the electric motor 1 is being dynamically braked is proportional to the desired magnitude of the sense of rotation reversal. Once this dynamic braking time period has elapsed, the new electric current polarity is applied to the winding of the electric motor 1, and the motor 1 accelerates to the desired new operating speed.

The approach taken by the present invention results in several advantages. First of all, only large magnitude commands are affected, while low-level command response is unaffected. Secondly, lower peak currents occur in the driving circuitry, which renders it possible to use smaller, less expensive motor driver circuitry with less heat to be dissipated. Furthermore, there is encountered a lower amount of radiated and induced electric motor noise. Last but not least, lower peak currents in the motor 1 increase the motor life through lower heat generation, and there is also less of a chance of demagnetizing the permanent magnets of the electric motor 1.

Figure 5:
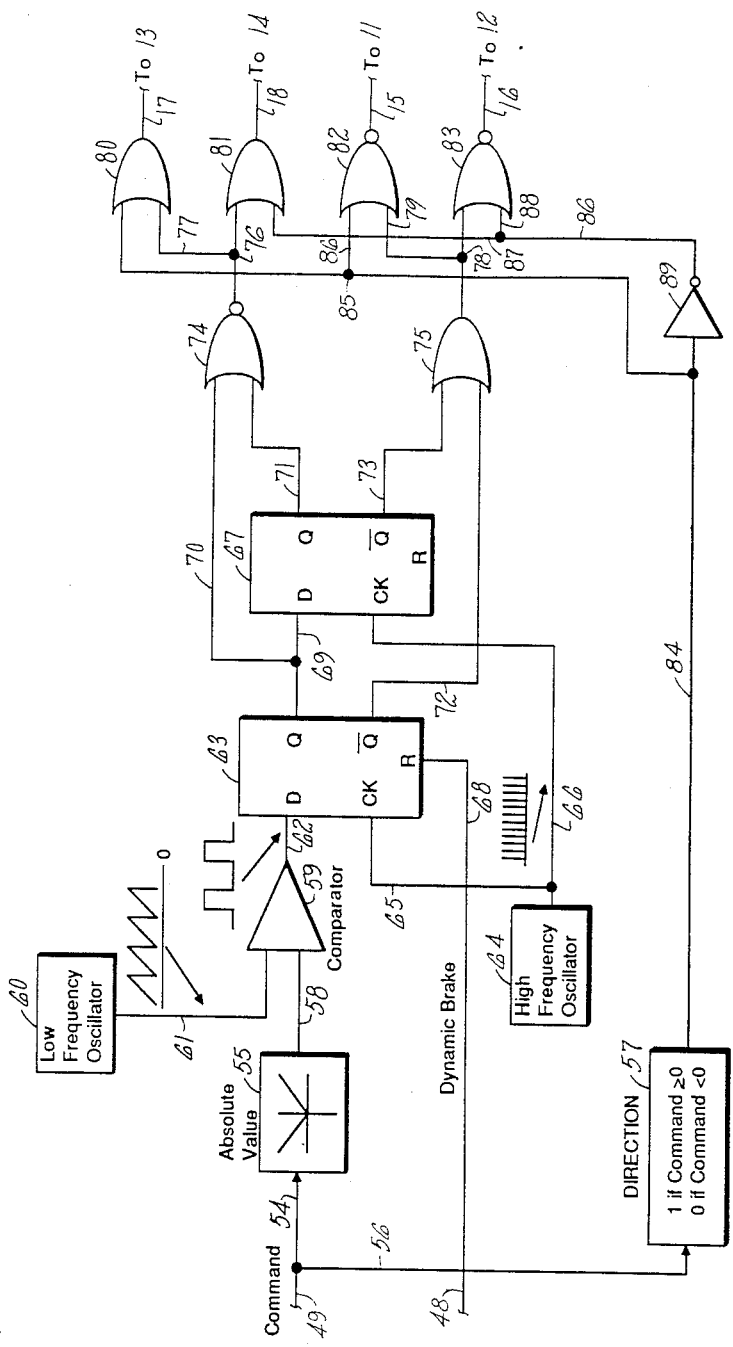
FIG. 5 is a circuit diagram of an exemplary switch driving or translation circuit of the control circuitry of FIG. 1.
Figure 6:
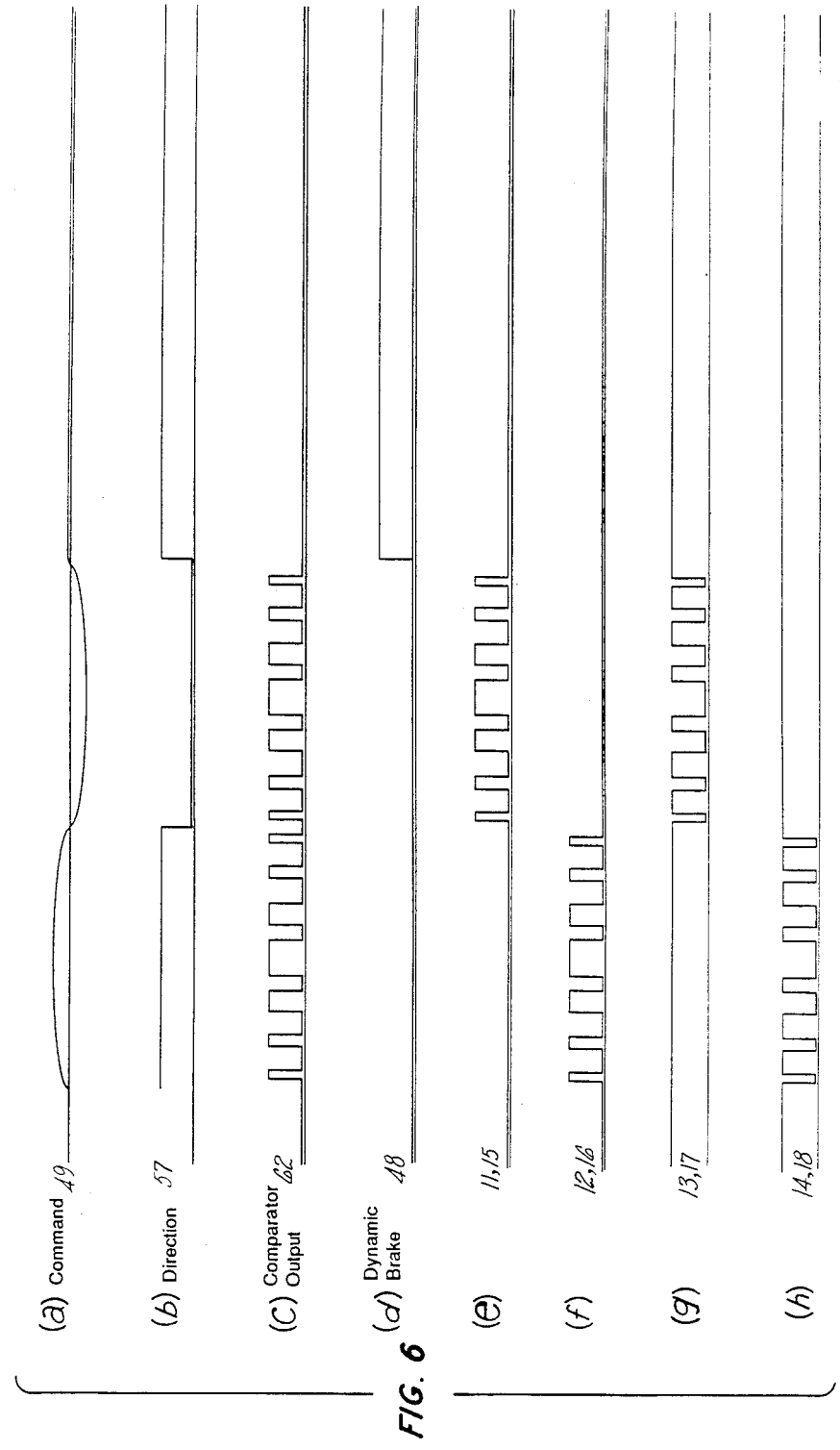
FIGS. 6a to 6h are graphic representations of dependences of various signals appearing in the circuit of FIG. 5 on time.
Figure 7:
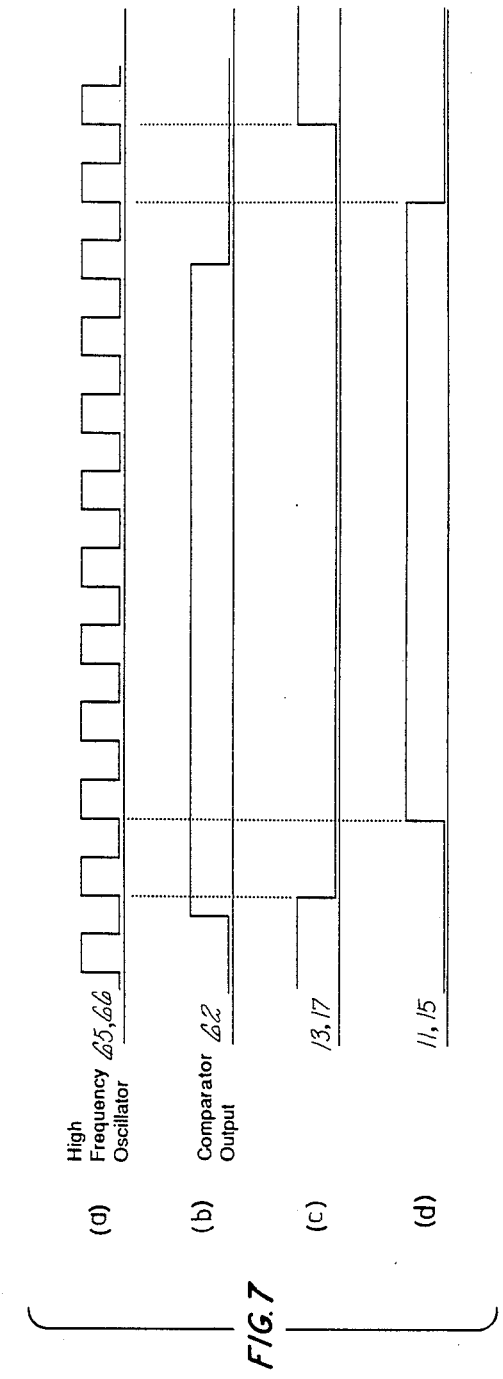
FIGS. 7a to 7d are additional graphic representations of dependences of selected signals appearing in the circuit of FIG. 5 on time, at a time scale differing from that of FIGS. 6a to 6h.

The particulars of an example of the construction of the driving or translating circuit 19 that drives the switches 11 to 14 will now be explained with reference to FIG. 5 of the drawing where, consistently with FIG. 1 of the drawing, the reference numerals 48 and 49 have been used to identify the dynamic brake flag input and the intermediate command input, respectively, and the reference numerals 15, 16, 17 and 18 have been used to indicate the respective outputs of the circuit 19 that control the switching of the switches 11 to 14.

The command input 49 is connected via an electrical connection 54 to an input of an absolute value generating device 55 that has a similar or identical construction as the device 40, and via an electrical connection 56 to a direction discriminator device 57 of a known construction which generates a signal of one binary value (such as binary "1") when the value of the intermediate command signal is at least equal to zero and of the other binary value (such as binary "0") when the value of the intermediate command signal falls below zero.

The absolute value of the intermediate command signal appearing at the output of the device 55 is supplied through an electrical connection 58 to one input of a comparator 59, while an output signal of a low-frequency oscillator 60 is supplied through an electrical connection 61 to another input of the comparator 59. The oscillator 60 is a commonly available sawtooth oscillator which operates at and determines the frequency of the basic pulse width modulation.

The comparator 59 compares the output signal of the oscillator 60 with the absolute value of the intermediate command signal appearing at the output of the device 55. If the magnitude of the absolute value exceeds the instantaneous magnitude of the sawtooth-shaped output signal of the oscillator 60, then the output signal of the comparator 59 has a binary "1" value; otherwise, it has a binary "0" value. The comparator 59 thus issues pulse-modulated signals whose width is determined by the instantaneous magnitude of the absolute value of the intermediate command signal.

The output of the comparator 59 is fed through an electrical connection 62 to a data input D of a first flip-flop 63. An output signal of a high-frequency oscillator 64, whose frequency is orders of magnitude higher than that of the output signal of the low-frequency oscillator 60 and which generates a square waveform at its output, is supplied through an electrical connection 65 to a clock input CK of the first flip-flop 63, as well as through an electrical connection 66 to a clock input CK of a second flip-flop 67. The dynamic brake flag input 48 of the circuit 19 is supplied through an electrical connection 68 to a resetting input R of the first flip-flop 63.

An output Q of the first flip-flop 63 is connected by an electrical connection 69 to a data input D of the second flip-flop 67. The Q output of the first flip-flop 63 and an output Q of the second flip-flop 67 are connected via respective electric connections 70 and 71 to respective inputs of a NOR-gate 74, while an inverted output $\overline{Q}$ of the first flip-flop 63 and an inverted output $\overline{Q}$ of the second flip-flop 67 are similarly connected via respective electric connections 72 and 73 to respective inputs of an OR-gate 75.

During operation with the dynamic brake signal "off", the signal supplied to the D input of the flip-flop 63 will appear at the Q output, and its logic inverse at the $\overline{Q}$ output, of the flip-flop 63 on the rising edge of the clock signal supplied to the CK input of the first flip-flop 63, and propagate in the same manner to the Q and $\overline{Q}$ outputs of the second flip-flop 67 on the next following rising edge of the clock signal supplied to the CK input of the flip-flop 67.

The output of the NOR-gate 74 is coupled by respective electric connections 76 and 77 to first inputs of OR-gates 80 and 81, whereas the output of the OR-gate 75 is coupled by respective electric connections 78 and 79 to first inputs of NOR-gates 82 and 83. The outputs of the OR-gates 80 and 81 are connected to the lines 17 and 18 leading to the switches 13 and 14, and the outputs of the NOR-gates 82 and 82 are connected to the lines 15 and 16 leading to the switches 11 and 12.

The output of the direction discriminator device 57 is connected directly through electrical connections 84, 85 and 86 to respective other inputs of the OR-gate 80 and of the NOR-gate 82, and indirectly through electrical connections 84, 87 and 88 via an inverter 89 interposed in the electrical connection 87 to respective other inputs of the OR-gate 81 and of the NOR-gate 83. This causes the switch 11 to be permanently open and the switch 13 to be permanently closed whenever the value of the intermediate command signal on the input 49 of the circuit 19 is zero or more, and the switch 12 to be permanently open and the switch 14 to be permanently closed whenever the value of the intermediate command signal on the input 49 of the circuit 19 is less than zero, as indicated in FIGS. 6e to 6h as considered in conjunction with FIG. 6a.

It is also shown in the left-hand half of FIGS. 6a to 6h that, when the dynamic brake flag is not set, that is, when the dynamic brake flag signal appearing at the input 48 of the circuit 19 has a binary "0" value, the switches 12 and 14 alternate in opposite senses between their open and closed states when the value of the intermediate command signal on the input 49 of the circuit 19 is zero or more (see first quarter of FIGS. 6a to 6h), so that, with the switch 11 being permanently open and the switch 13 being permanently closed under these circumstances, electric current flows through the winding of the electric motor 1 in the rightward direction as considered in FIG. 1 of the drawing between the electric conductor 6 and either the electric conductor 5 or the electric conductor 7, so that the electric motor 1 is energized to rotate in one of its senses of rotation.

On the other hand, as shown in the second quarter of FIGS. 6a to 6h, when the value of the intermediate command signal on the input 49 of the circuit 19 less than zero with the dynamic brake flag signal appearing at the input 48 of the circuit 19 still having the binary "0" value, the switches 11 and 13 alternate in opposite senses between their open and closed states, so that, with the switch 12 being permanently open and the switch 14 being permanently closed under these circumstances, electric current flows through the winding of the electric motor 1 in the leftward direction as considered in FIG. 1 of the drawing between the electric conductor 7 and either the electric conductor 4 or the electric conductor 6, so that the electric motor 1 is energized to rotate in its other sense of rotation. It may be seen that in each of these instances, pulses whose widths are proportional to the instantaneous absolute value of the intermediate command signal are routed to the proper switches in dependence on the direction signal.

Now, as additionally shown in the right-hand half of FIGS. 6a to 6h, when the dynamic brake flag is set, that is, when the dynamic brake flag signal appearing at the input 48 of the circuit 19 has a binary "1" value, the flip-flops 63 and 67 are constantly reset, so that both ends of the winding of the electric motor 1 are connected through the switches 13 and 14 with one and the same terminal 9 of the D.C. source 10, while the switches 11 and 12 are open and thus disconnect the winding from the other terminal 8. This situation persists until the brake flag signal delivered to the input 48 reacquires its binary "0" value, resulting in dynamic braking of the electric motor 1.

It will be appreciated that the first and second flip-flops are in a master-slave relationship. This results in a situation that is graphically depicted in FIGS. 7a to 7d of the drawing for the switches 13 and 11 with the intermediate command signal supplied to the input 49 of the circuit 19 having a negative value and the dynamic brake signal supplied to the input 48 having a binary "0" value. It may be seen that the switch 13 opens before the switch 11 closes as the comparator output signal goes from binary "0" to binary "1", and closes after the switch 11 has been opened as the comparator output signal goes from binary "1" to binary "0". This means that the switches 11 and 13 are never simultaneously closed, which would result in a short-circuit connection between the lines 4 and 6 and thus between the terminals 8 and 9 of the D.C. source 10.

This is similarly applicable, in a manner that has not been shown in the drawing, to a situation where the intermediate command signal supplied to the input 49 of the circuit 19 has a positive value with the dynamic brake signal supplied to the input 48 having a binary "0" value. In this situation, the switch 12 opens before the switch 14 closes as the comparator output signal goes from binary "0" to binary "1", and closes after the switch 14 has been opened as the comparator output signal goes from binary "1" to binary "0". This means that the switches 12 and 14 also are never simultaneously closed, which would result in a short-circuit connection between the lines 5 and 7 and thus between the terminals 8 and 9 of the D.C. source 10. Thus, in each of these situations, damage to the lines 4 to 7, to the switches 11 to 14, and/or to the D.C. source 10, which would result from such short-circuiting, is reliably avoided.

While the present invention has been illustrated and described as embodied in a particular construction of the electric motor control and driving circuitry, it will be appreciated that the present invention is not limited to this particular example; rather, the scope of protection of the present invention is to be determined solely from the attached claims.

We claim:

1. An arrangement for controlling the operation of a reversible D.C. electric motor including a winding having two ends each of which is connected to both the positive and negative terminals of an electric current source through respective control switches that can be selectively closed and opened in response to command signals to apply voltage differentials across the winding with attendant electric current flow through the winding in one or the opposite direction for operating the electric motor in one or the other of its senses of rotation with intervening rotation sense reversals, comprising means for determining from the command signals an occurrence of and issuing a control signal indicative of, a situation where a reversal in the sense of rotation of the electric motor is to ensue; and means for temporarily replacing the original command signals in response to said output signal by substitute command signals of such a character that both of the winding ends are connected through the respective control switches to only one of the electric current source terminals with attendant dynamic braking of the electric motor.

2. The arrangement according to claim 1, wherein said determining means includes means for providing lagged versions of the original command signals and means for comparing the original command signals with the lagged versions thereof and issuing said control signal for use in activating said replacing means when such comparison indicates that the rotation sense of the electric motor is to be reversed.

3. The arrangement according to claim 2, wherein said determining means further includes means for detecting from the values of the original command signals when the rotation sense reversal would cause the electric current through the winding to exceed a predetermined magnitude, and means for activating said replacing means only upon such detection.

4. An arrangement for controlling the operation of a reversible D.C. electric motor including a winding having two ends each of which is connected to both the positive and negative terminals of an electric current source through respective control switches that can be selectively closed and opened in response to command signals to apply voltage differentials across the winding with attendant electric current flow through the winding in one or the opposite direction for operating the electric motor in one or to the other of its senses of rotation with intervening rotation sense reversals, comprising means for determining from the command signals an occurrence of, and issuing a control signal indicative of, a situation where a reversal in the sense of rotation of the electric motor is to ensue; and means for temporarily replacing the original command signals in response to said output signal by substitute command signals of such a character that both of the winding ends are connected through the respective control switches to only one of the electric current source terminals with attendant dynamic braking of the electric motor, said determining means including means for providing lagged versions of the original command signals, means for comparing the original command signals with the lagged versions thereof and issuing a control signal for use in activating said replacing means when such comparison indicates that the rotation sense of the electric motor is to be reversed, and means for detecting from the values of the original command signals when the rotation sense reversal would cause the electric current through the winding to exceed a predetermined magnitude, including means for subtracting the original command signals and the lagged versions thereof from one another, means for forming an absolute value of the subtraction result, and means for comparing the absolute value with a predetermined threshold value and issuing an additional control signal only when said absolute value exceeds said threshold value, and means for activating said replacing means only upon such detection, including means for establishing simultaneous occurrence of both said control signal and said additional control signal and issuing an activating signal for activating said replacing means only in response to such occurrence.

5. The arrangement according to claim 4, wherein said control and additional control signals are binary signals; and wherein said establishing means is an AND-gate.

6. The arrangement according to claim 4, wherein said replacing means includes a two-position switch switchable by said activating signal from a rest position thereof in which it transmits the lagged versions of the command signals into an activated position thereof in which it transmits a predetermined command signal value.

7. The arrangement according to claim 6, wherein said replacing means further includes means for converting the output signal of said two-position switch and said activating signal into ultimate switching signals for switching the control switches.

8. An arrangement for controlling the operation of a reversible D.C. electric motor including a winding having two ends each of which is connected to both the positive and negative terminals of an electric current source through respective control switches that can be selectively closed and opened in response to command signals to apply voltage differentials across the winding with attendant electric current flow through the winding in one or the opposite direction for operating the electric motor in one or the other of its senses of rotation with intervening rotation sense reversals, comprising means for providing lagged versions of the original command signals, means for comparing the original command signals with the lagged versions thereof and issuing a control signal when such comparison indicates that the rotation sense of the electric motor is to be reversed, means for subtracting the original command signals and the lagged versions thereof from one another, means for forming an absolute value of the subtraction result, means for comparing the absolute value with a predetermined threshold value and issuing an additional control signal only when said absolute value exceeds said threshold value, means for establishing simultaneous occurrence of both said control signal and said additional control signal and issuing an activating signal only in response to such occurrence, a two-position switch switchable by said activating signal from a rest position thereof in which it transmits the lagged versions of the command signals into an activated position thereof in which it transmits a predetermined command signal value, means for converting the output signal of said two-position switch and said activating signal into ultimate switching signals for switching the control switches, said switching signals being of such a character that both of the winding ends are connected through the respective control switches to only one of the electric current source terminals with attendant dynamic braking of the electric motor when said converting means receives said activating signal and said predetermined command signal value.

9. A method of controlling the operation of a reversible D.C. electric motor including a winding having two ends each of which is connected to both the positive and negative terminals of an electric current source through respective control switches that can be selectively closed and opened in response to command signals to apply voltage differentials across the winding with attendant electric current flow through the winding in one or the opposite direction for operating the electric motor in one or the other of its senses of rotation with intervening rotation sense reversals, comprising the steps of determining from the command signals an occurrence of, and issuing a control signal indicative of, a situation where a reversal in the sense of rotation of the electric motor is to ensue; and temporarily replacing the original command signals in response to said control signal by substitute command signals of such a character that both of the winding ends are connected through the respective control switches to only one of the electric current source terminals with attendant dynamic braking of the electric motor.

10. A method of controlling the operation of a reversible D.C. electric motor including a winding having two ends each of which is connected to both the positive and negative terminals of an electric current source through respective control switches that can be selectively closed and opened in response to command signals to apply voltage differentials across the winding with attendant electric current flow through the winding in one or the opposite direction for operating the electric motor in one or the other of its senses of rotation with intervening rotation sense reversals, comprising the steps of providing lagged versions of the original command signals, comparing the original command signals with the lagged versions thereof and issuing a control signal when such comparison indicates that the rotation sense of the electric motor is to be reversed, subtracting the original command signals and the lagged versions thereof from one another, forming an absolute value of the subtraction result, comparing the absolute value with a predetermined threshold value and issuing an additional control signal only when said absolute value exceeds said threshold value, establishing simultaneous occurrence of both said control signal and said additional control signal and issuing an activating signal only in response to such occurrence, presenting an output signal which is switched in response to the activating signal from the lagged versions of the command signals to a predetermined command signal value, converting the output signal and the activating signal into ultimate switching signals for switching the control switches, the switching signals being of such a character that both of the winding ends are connected through the respective control switches to only one of the electric current source terminals with attendant dynamic braking of the electric motor when the activating signal and the predetermined command signal value are being converted.

* * * * *